United States Patent

Ryan

[15] 3,666,097
[45] May 30, 1972

[54] METHOD AND APPARATUS FOR CLEANING A FILTER CARTRIDGE

[72] Inventor: Leo F. Ryan, Somerville, N.J.

[73] Assignee: Ecodyne Corporation, Chicago, Ill.

[22] Filed: June 8, 1970

[21] Appl. No.: 48,809

Related U.S. Application Data

[63] Continuation of Ser. No. 768,580, Aug. 30, 1968, abandoned.

[52] U.S. Cl. ................................210/82, 210/193, 210/333
[51] Int. Cl. ..........................................B01d 25/32
[58] Field of Search....................210/75, 82, 193, 333, 411, 210/274

[56] References Cited

UNITED STATES PATENTS 1,871,122   8/1932   Kretzschmar..........................210/274
3,373,104   3/1968   Ryan.....................................210/82 X

*Primary Examiner*—J. L. DeCesare
*Attorney*—Hume, Clement, Hume & Lee and Charles M. Kaplan

[57] ABSTRACT

A method for cleaning pre-coated filter cartridges vertically mounted in a filter tank in which the tank is drained and then refilled by passing a mixture of air and water through the cartridges in reverse flow to their normal operation. As the tank fills with water, the filters are gradually cleaned from bottom to top. The tank may then be gradually drained while continuing the delivery of air to the interior of the cartridges. The invention also provides apparatus including a filter tank having gas distributors on the bottoms of the filter cartridge seat means. The gas distributors form a mixture of gas and liquid for delivery to the filter cartridges.

15 Claims, 3 Drawing Figures

INVENTOR.
Leo F. Ryan
BY Hume, Clement, Hume & Lee
Attorneys.

Patented May 30, 1972
3,666,097
2 Sheets-Sheet 2
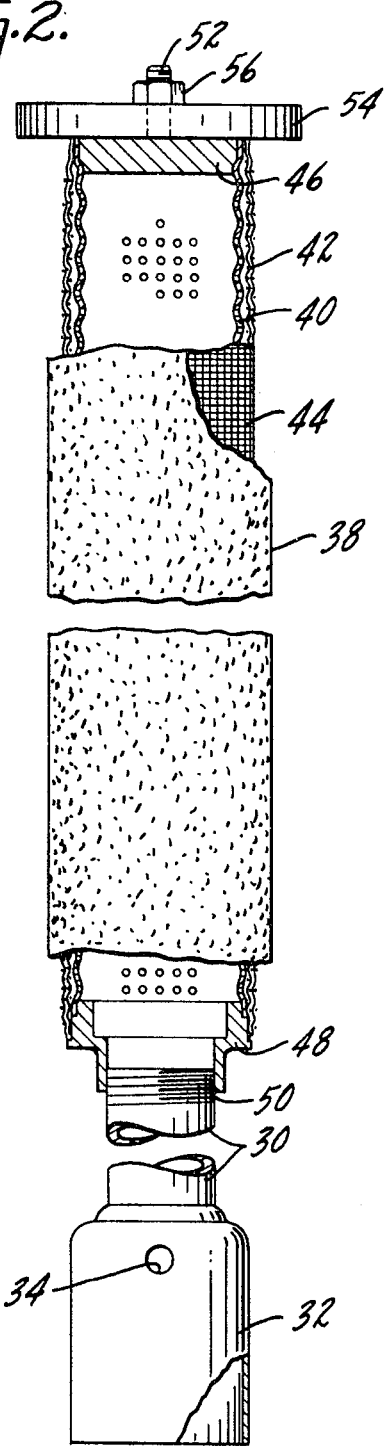
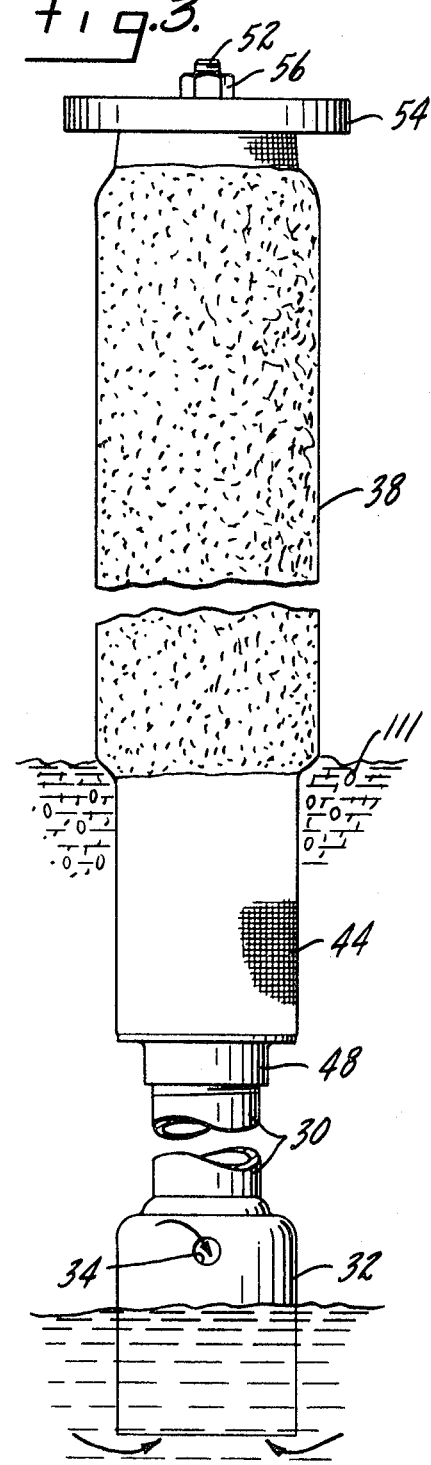
INVENTOR.
Leo F. Ryan
BY Hume, Clement, Hume & Lee
Attorneys.

METHOD AND APPARATUS FOR CLEANING A FILTER CARTRIDGE

This application is a continuation of my prior copending application Ser. No. 768,580, filed Aug. 30,1968, and now abandoned.

The present invention relates to an improved method for cleaning a filter cartridge and to improved filtration apparatus incorporating means for cleaning filter cartridges.

It has been discovered that liquids may be very effectively purified by passing them through a filter screen which has been pre-coated with a layer of ion exchange resin particles in the size range of 60 to 400 mesh, hereinafter referred to as "finely divided" resin particles. This method is disclosed and claimed in U.S. Pat. No. 3,250,703, issued May 10, 1966, and assigned to the assignee of this application.

Periodically, the finely divided resin particles become exhausted, and a filter cake builds up. It is then necessary to clean the filter in order to remove the resin particles so that they can be replaced with another layer of fresh particles, referred to herein as a "pre-coat" layer. The filters normally employed are annular in shape and are made of perforated metal or the like covered with a screen or with wound cotton or nylon to form a relatively fine filter.

Generally, the method of the present invention contemplates the cleaning of a filter cartridge vertically positioned within a filter tank for treating influent liquid by first draining the influent liquid from the filter tank until its level is at least below that of the filter cartridge. The tank is then gradually filled at least to the top of the filter cartridge by passing a mixture of gas and wash liquid into a lower portion of the filter cartridge in reverse flow to the normal operation. As the liquid flows out of the filter cartridge and into the tank, it gradually fills the filter tank with wash liquid. The apparatus of the present invention generally comprises a filter tank having a plurality of annular filter cartridges vertically mounted therein together with means for introducing a mixture of gas and liquid into a lower portion of the filter cartridges and means for draining liquid from the filter tank.

The invention, both as to its organization and method of operation, taken together with the objects and advantages thereof, will be best understood by reference to the following detailed description taken in conjunction with the accompanying drawings, in which:

FIG. 2 is a side elevation view of a filter cartridge and seat means in accordance with the present invention, also illustrating the gas distributor on the bottom of the seat means; and FIG. 3 is a side elevation view of a filter cartridge, seat means, and gas distributor as in FIG. 2, shown during the cleaning step.

Figure 1:
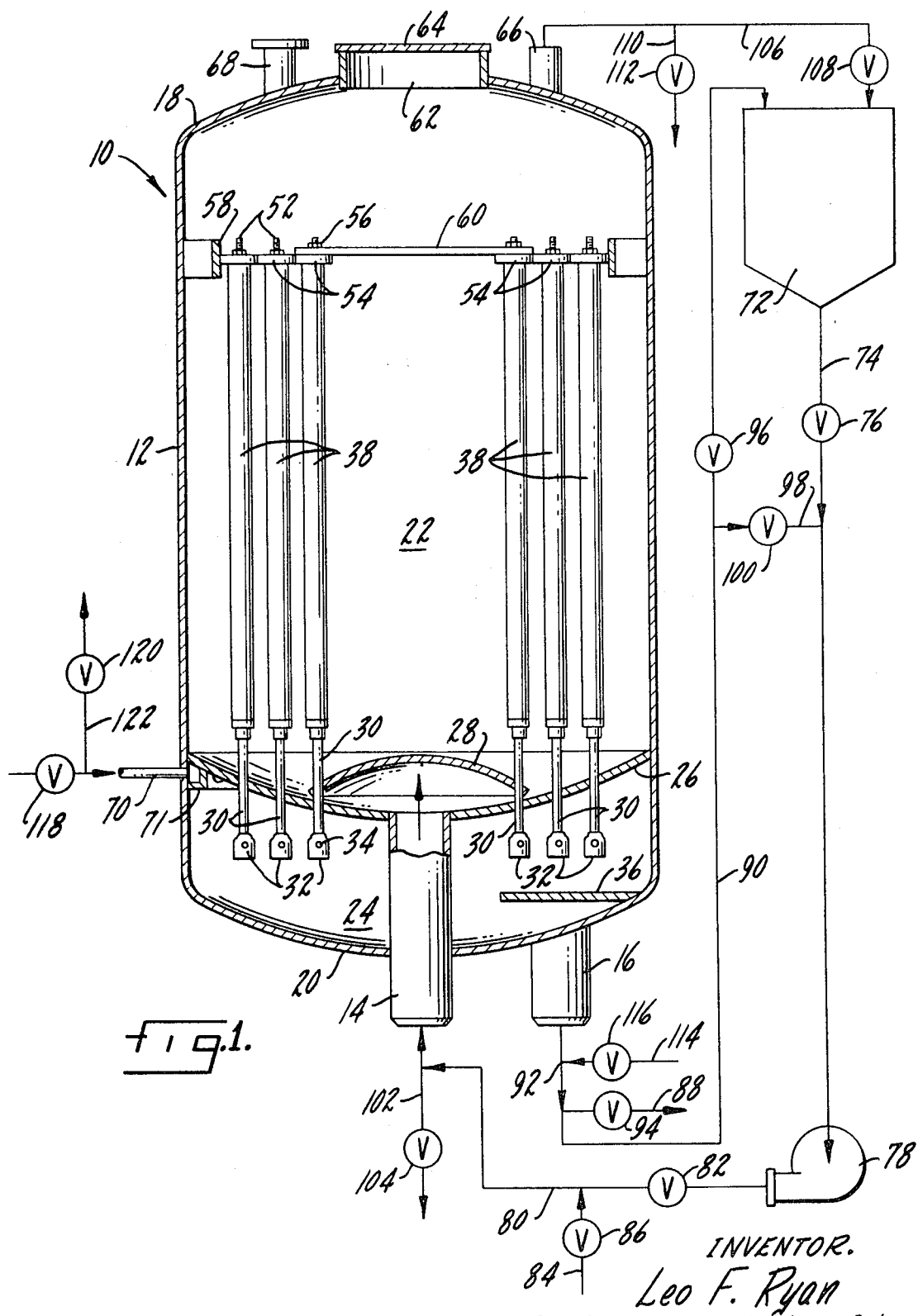
FIG. 1 is a partially schematic representation of a filtering system embodying the features of the present invention, including a filter tank which is cut away to illustrate the interior thereof.

Referring to FIG. 1, the filter apparatus of the present invention is generally indicated by reference numeral 10. The apparatus 10 includes a filter tank 12 having an inlet line 14 and an outlet line 16. The filter tank 12 is a generally cylindrical vessel made of steel or the like, and having an outwardly convex top 18 and an outwardly convex bottom 20. The tank 12 is divided into an upper, influent compartment 22 and a lower, filtrate compartment 24 by a downwardly convex tube sheet plate 26, suitably secured to the interior of the tank 12 by welding or the like. The inlet line 14 extends through the bottom 20 of the tank 12 and communicates with the influent compartment 22 so that all of the influent liquid is passed directly to the influent compartment 22. The inlet pipe 14 is attached to the tube sheet plate 26 by welding or the like. In this manner, direct communication between the influent compartment 22 and the filtrate compartment 24 is precluded. An upwardly convex distributor plate 28 is mounted on the tube sheet plate 26 above the inlet line 14. This distributor plate 28 distributes liquid entering through the inlet line 14 radially outwardly into the influent compartment 22.

A plurality of filter cartridge seat means 30 extend vertically through holes in the tube sheet plate 26, and are attached thereto by welding or other suitable means. The filter cartridge seat means 30 are annular in shape, and are substantially parallel to the longitudinal axis of the filter tank 12, providing communication between the influent compartment 22 and the filtrate compartment 24. In the embodiment shown, the filter cartridge seat means 30 have their upper ends threaded to receive filter cartridges. The seat means 30 also include gas distributors 32 on their lower ends.

Referring to FIG. 2, the gas distributors 32 are annular in shape, and each has a gas inlet port 34 on an upper portion of the side. The bottoms of the gas distributors 32 are open to provide a lower, liquid inlet below the upper, gas inlet. In the preferred embodiment shown in the drawings, the liquid inlet is at the bottom, and lies in a substantially horizontal plane. As shown in FIG. 1, the gas distributors 32 are mounted so that the liquid inlets of all of the distributors 32 lie in substantially the same horizontal plane. As described in more detail hereinafter, the gas distributors 32 insure an even distribution of a gas-liquid mixture to the filter cartridges during the cleaning procedure.

Referring again to FIG. 1, a backwash baffle 36 is positioned opposite the outlet line 16 in the filtrate compartment 24 to provide for an even distribution of liquid during the cleaning step, as hereinafter described.

Mounted vertically within the influent compartment 22 are a plurality of filter cartridges or elements 38 through which the influent stream must pass before entering the filtrate compartment 24 and being discharged from the filter tank 12 through the outlet lines 16. The filter cartridges 38 are annular in shape. As shown in FIG. 2, the filter cartridges 38 each include a corrugated, perforated body portion 40 of suitable corrosion-resistant material such as aluminum or stainless steel. The body portion 40 is covered with a layer of coarse screen 42, preferably about 8–10 mesh. This coarse screen 42 is, in turn, wrapped with a layer of fine mesh screen 44, as is well known to those skilled in the art. In this instance, the fine mesh screen is 50 × 250 mesh. The filter cartridges 38 include a top cap assembly 46 and a lower mounting means 48, both of which are welded to the body portion 40 and the screens 42, 44 so that access to the interior of the cartridge 36 is prohibited except through the screens 42, 44 or through the lower mounting means 48. The lower mounting means 48 includes a threaded portion 50 which screws onto the threaded portion of the filter cartridge seat means 30. The top cap assembly 46 includes a central, upwardly extending bolt 52 to which a spacer means 54 and nut 56 are secured. It will be understood that filter construction and mounting means other than those described above may be used in accordance with the present invention, as is well known to those skilled in the art. For example, filter cartridges wound with nylon or other synthetic or natural fibers may be employed, and for some uses are preferred over the all-metal elements shown in the specific embodiment herein. Similarly, other mounting means may be employed. Suitable alternate filter elements, together with alternate mounting means, are disclosed in U.S. Pat. No. 3,279,608, and in U.S. Pat. No. 3,405,807, issued Oct. 15, 1968 both of which are assigned to the assignee of this application. Ser. No. 644,710 also discloses suitable sealing means for use with filter cartridges of the fiber-wound type.

As shown in FIG. 1, a plurality of filter cartridges 38 are suitably spaced within the tank 12 by the spacer means 54, and are also suitably spaced from the side walls of the tank 12 by an annular ridge member 58. To further stabilize the filter cartridges 38 within the tank 12, the innermost cartridges 38 are secured to adjacent or other cartridges by a plurality of retaining bars 60. The use of such retaining bars is well known to those skilled in the art, and is shown in more detail in U.S. Pat. No. 3,279,608.

The filter cartridges 38 are placed into and removed from the filter tank 12 through a small manhole opening 62 in the top 18 of the filter tank 12. The manhole opening 62 has a cover 64 which can be removed or opened as desired to provide access to the interior of the tank 12. The tank 12 is also provided with a high recycle outlet 66 in the top 18, and with a spare inlet pipe 68, which in this instance is capped.

As also shown in FIG. 1, an air inlet line 70 communicates with an upper portion of the filtrate chamber 24. Opposite the air inlet line 70, an apertured baffle 71 is located, welded to the underside of the tube sheet plate 26. The baffle 71 prevents the creation of local areas of excess air velocity in the filtrate compartment 24 during the cleaning procedure.

The filter apparatus 10 of the present invention will normally be used to treat a stream of water, such as condensate water in the steam generating system of an electrical power plant. Similarly, a mixture of water and air is normally employed during the cleaning procedure. The following description is therefore in terms of these substances. As those skilled in the art will understand, however, the filter apparatus 10 may be used to treat other liquids. The filter apparatus 10 of the present invention is also particularly well adapted to the treatment of condensate water utilized in connection with a nuclear power generating plant, which may contain radioactive contaminants. Similarly, other gases such as nitrogen, helium, and oxygen, and other liquids such as organic solvents, detergent solutions, etc., could be used during the cleaning procedure.

A water slurry of suitable pre-coat medium, in this instance finely divided ion exchange resin particles in the size range of 60 to 400 mesh, is stored in a pre-coat tank 72. A slurry line 74 controlled by a slurry valve 76 connects the pre-coat tank 72 with a slurry pump 78. A transfer line 80 connects the pump 78 with the inlet line 14 of the filter tank 12. A transfer valve 82 adjacent to the pump 78 in the transfer line 80 controls the passage of slurry or liquid from the pump 78.

Water or other liquid to be filtered in the filter tank 12 enters the system through a feed line 84 having an intake control valve 86. The feed line 84 is connected to the transfer line 80 between the transfer valve 82 and the inlet line 14.

The outlet line 16 from the filter tank 12 is connected to a service line 88 and a pre-coat return line 90 at a T-juncture 92. The service line 88 is connected to service units (not shown) such as a steam generator or the like, and has a service valve 94. The pre-coat return line 90 is connected to the pre-coat tank 72 and has a return valve 96 to control the flow of slurry back to the pre-coat tank 72.

A bridge line 98 with a bridge valve 100 interconnects the pre-coat return line 90 and the slurry line 74. A drain line 102 with a drain valve 104 communicates with the inlet line 14.

A pre-coat recycle line 106 having a pre-coat recycle valve 108 communicates with an upper portion of the tank 12 at the high recycle outlet 66. The pre-coat recycle line 106 has communicating therewith a vent line 110 having a vent valve 112. The vent line 110 communicates with the pre-coat recycle line 106 between the pre-coat recycle valve 108 and the high recycle outlet 66.

A source of washing liquid under pressure is provided through a cleansing water inlet line 114 communicating with the filtrate compartment 24 through the outlet line 16. As shown in FIG. 1, the cleansing water inlet line includes a valve 116.

In operation, during the pre-coating step, a pre-coat layer of finely divided ion exchange resin particles is deposited upon the upstream sides of the filter cartridges 38, i.e., on the sides where the water is introduced into the filter cartridges during normal operation. Similarly, during the filtering step a filter cake builds up within and on the upstream side of the pre-coat layer.

In preparing the filter system 10 for operation, the initial step is to pre-coat the filter cartridges 38. In order to accomplish this, the filter tank 12 is filled with a low-impurity water, such as demineralized water. A slurry of pre-coat medium and demineralized water is prepared in the pre-coat tank, the pre-coat medium being finely divided resin particles. The pre-coat medium may be maintained in suspension by a suitable motorized stirrer (not shown).

To initiate the pre-coating step, all valves are closed except the slurry valve 76, the transfer valve 82, the return valve 96, and the pre-coat recycle valve 108. The pre-coating step is initiated by starting the pump 74, thereby drawing the resin pre-coat slurry from the pre-coat tank 72 and through the slurry line 74 to the pump 78. The slurry is forced by the pump 78 through the transfer line 80 and the inlet line 14 into the influent compartment 22 of the filter tank 12. The pressure of the incoming slurry forces the demineralized water in the filter tank 12 through the filter cartridges 38 and out of the filter tank 12 via the filtrate compartment 24 and the outlet line 16. Liquid enters the pre-coat tank 72 through the return line 90.

In addition, a portion of the liquid is withdrawn from the filter tank 12 at a high-recycle outlet 66 and returned to the pre-coat tank 72 through the pre-coat line 106. After the pre-coat slurry has completely filled the influent compartment 22, so that a relatively even distribution of finely divided resin particles throughout the influent compartment 22 is obtained, the pre-coat recycle valve 108 is closed. As the pre-coat slurry is brought into contact with the upstream surfaces of the filter cartridges 38, the finely divided resin particles are separated from the slurry and deposited as a pre-coat layer upon the surfaces of the filter cartridges 38. The slurry is circulated through the filter system in this manner until a sufficient depth of resin pre-coat layer is deposited. The pre-coating step is terminated by closing the slurry valve 76 and the return valve 96 and opening the bridge valve 100. The pump 78 is kept running until the recycle stream is clear. Then the filter system is ready to be used to treat feed water. The thickness of the pre-coat layer may be greater than a few inches, but it is preferred that the layer have a thickness in the range of about one-sixteenth to 2 inches, and more preferably about one-eighth to 1 inch, and most preferably one-eighth to five-eighths inch.

The service run is begun by closing the bridge valve 100 and the transfer valve 82 and opening the service valve 94 and the intake control valve 86. In this manner, untreated water enters the filter system through the feed line 84 and passes through the transfer line 80 and the inlet line 14 to the influent compartment 22. The pressure of the incoming untreated water forces it through the resin pre-coat layer, the filter cartridges 38, and the filtrate compartment 24 into the outlet line 16.

As the untreated water passes through the pre-coat layer, an ion exchange reaction takes place to remove dissolved impurities from the water. In addition, undissolved impurities are removed from the untreated water by virtue of the water passing through the filter cartridges 38 and the pre-coat layer of finely divided ion exchange resin particles. The filter cake, consisting of undissolved impurities, builds up within and on the pre-coat layer as the process continues. The purified or treated water flows through the filtrate compartment 24 and the outlet line 16 to the service line 88 for use.

Eventually, the resins will become exhausted and must be regenerated or discarded. At this time the filtering or service cycle is stopped by closing the intake valve 86 and the service valve 94. To clean the filter cartridges 38, the vent valve 112 and the drain valve 104 are opened, the the influent compartment 22 is drained. The drain valve 104 is closed after the draining is completed. If it is desired to retain this volume of liquid which is drained from the tank 12, it may be drained through the filter elements by opening the service valve 94 and conducting the liquid to service or to a suitable storage zone. It is particularly desirable to retain this volume of liquid when the apparatus of the present invention is used in conjunction with a nuclear reactor, since in such reactors the liquid is normally recirculated for steam generation. The retention of this volume of liquid avoids the necessity for decontamination to remove radioactive materials. The necessary modifications and piping to accomplish this are not shown in the drawings, but will be obvious to one of ordinary skill in the art. If the liquid being filtered is at high temperatures, i.e., above 212° F. for water, a cooling step may be performed at this time by circulating cool water through the filter tank 12.

To remove the pre-coat layer from the filter cartridges 38, a mixture of air and water are passed into them at a lower portion in reverse flow to the normal operation. To accomplish this, air is introduced into the filtrate compartment 24 by opening an air valve 118 in the air inlet line 70 communicating with an upper portion of the filtrate compartment 24. Simultaneously, water is admitted to the filtrate compartment 24 by opening the valve 116 in the cleansing water inlet line 114, delivering water under pressure into the outlet line 16. The backwash baffle 36 insures that this water will be evenly distributed throughout the filtrate compartment 24, and will not be delivered primarily to those cartridges 38 having seat means 30 located near the outlet line 16. The air valve 118 and the valve 116 in the cleansing water inlet line 114 are adjusted so that the water level within the filtrate compartment 24 will be maintained at a level corresponding approximately to the midpoint of the gas distributors 32. The pressure head produced by the introduction of air into the filtrate compartment 24 will prevent the liquid from rising further.

The gas distributors 32 are illustrated in FIG. 3 as they appear during the cleaning step. In that figure, it will be seen that the water level is approximately at the midpoint of the gas distributors 32. The water passes through the bottoms of the gas distributors 32 and through the seat means 30 to the interior of the filter cartridges 38. At the same time, air which has been fed into the filtrate compartment 24 through the air inlet line 70 passes through the gas metering ports 34 where it is mixed with water and passes up into the interior of the filter cartridges 38, forming air bubbles 111. The flow rate of the air is preferably in the range of about 1 to 1.5 cubic feet per minute per square foot of filter surface area. The water or other cleansing liquid is added at a sufficient rate to cause it to rise in the influent compartment 22 at about 3 to 15 inches per minute.

As the air-water mixture enters the interior of the filter cartridges 38, finely divided resin particles, together with the remaining constituents of the filter cake, are removed by the combined effect of agitated liquid and collapsing air bubbles as the air-water mixture passes out through the walls of the filter cartridges 38. As the input of air and water continues, the water flowing out into the surrounding influent compartment 22 forms a rising area of agitated, bubbling liquid and gas which gradually cleans the filter from bottom to top.

It is important that the liquid inlet openings in the gas metering cups 32 all be in substantially the same horizontal plane. If this were not true, it would be difficult to achieve a balanced input of gas and water to all of the filter cartridges 38. It is also, of course, necessary that the gas inlet ports 34 be above the liquid inlets.

After the influent compartment 22 has filled with water to at least the level corresponding to the tops of the filter cartridges 38, the delivery of liquid to the bottoms of the cartridges 38 is halted by closing the backwash valve 116. The drain valve 104 is then opened, and the water level within the influent compartment 22 begins to fall. The delivery of air through the air line 70 is continued so that a gradually falling liquid-gas interface is formed in the influent compartment 22, while bubbling, agitation, and further cleaning take place along the cartridges. During this draining procedure, finely divided resin particles and filter cake which have been removed from the cartridges 38 are carried away. Optimum results are achieved if the drain valve 104 is adjusted so that the water level in the influent compartment 22 falls at a rate of about 4 to 6 inches per minute.

After the influent compartment 22 has been drained, the drain valve 104 is closed, and the aforementioned cleaning procedure is repeated a sufficient number of times to thoroughly clean the filter cartridges 38. During the second and later cleaning steps, the influent compartment 22 may be filled at a greater rate than during the first filling, since a large portion of the resin particles and filter cake will have been removed during this first cleaning step.

After the filter cartridges 38 have been thoroughly cleaned, the influent compartment 22 is drained for the last time and the air supply is terminated by closing the air valve 118. The influent compartment 22 and filtrate compartment 24 are then filled with liquid such as demineralized water prior to initiating the pre-coating procedure as hereinbefore described. In order to be certain that both the influent zone 22 and the filtrate zone 24 are filled, a vent valve 120 on a vent line 122 communicating with the air inlet line 70 is opened. The vent valves 112, 120, are closed when water begins to run out of their respective vent lines 110, 122.

Typical solid cation exchange resin particles which may be employed in the filtering apparatus discussed herein are the divinylbenzene-styrene copolymer type, the acrylic type, the sulfonated coal type, and the phenolic type. These may be used in the sodium, hydrogen, ammonium, or hydrazine form, for example. Typical solid anion exchange resin particles that may be employed are the phenol-formaldehyde type, the divinylbenzene-styrene copolymer type, the acrylic type, and the epoxy type. The anionic resin particles may be used in the hydroxide or chloride form, for example. Frequently, a mixture of anionic and cationic resin particles will be employed. When such a mixture is used, am agglomeration or "clumping" effect is sometimes observed, wherein the particles clump together to form overall particles of a larger size. It will be understood that, even where such an effect occurs, the pre-coat material will nevertheless be regarded as in the size range of 60–400 mesh, which is the size range of the anion and cation exchange resin particles prior to admixture.

Through the apparatus of the present invention has been discussed primarily in connection with a pre-coat material of finely divided ion exchange resin particles, it may likewise be used where the pre-coat material is of another material such as diatomaceous earth, or any other pre-coat materials, as will be understood by those skilled in the art.

Obviously, many modifications and variations of the present invention as hereinbefore set forth will occur to those skilled in the art, and it is intended to cover in the appended claims all such modifications and variations as fall within the true spirit and scope of the invention.

I claim:

1. A method for cleaning a filter cartridge vertically positioned within a filter tank having an upper, influent compartment and a lower, filtrate compartment, said filter cartridge being positioned within said influent compartment and having a pre-coat layer of finely divided particles, said method comprising: draining influent liquid from said influent compartment until the level of said influent liquid is at least below said filter cartridge; establishing a level of wash liquid in said filtrate compartment; delivering said wash liquid to the interior of said cartridge from a point below said liquid level; and simultaneously delivering a gas into said cartridge through a metering port entirely above said liquid level in said filtrate compartment to gradually fill said influent compartment at least to the top of said filter cartridge.

2. The method for cleaning a filter cartridge as defined in claim 1 wherein said influent compartment is filled with said wash liquid at a rate so that the liquid level in said tank rises in the range of about 3 to 15 inches per minute.

3. The method for cleaning a filter cartridge as defined in claim 2 wherein said gas has a flow rate of about 1 to 1.5 cubic feet per minute per square foot of filter surface area.

4. The method for cleaning a filter cartridge as defined in claim 1 further including the step of subsequently draining said wash liquid from said influent compartment while passing a gas to a lower portion of said filter cartridge.

5. The method for cleaning a filter cartridge as defined in claim 4 wherein said wash liquid is drained from said influent compartment at a rate so that the liquid level falls at a rate of about 4 to 6 inches per minute.

6. The method for cleaning a filter cartridge as defined in claim 4 wherein said gas is air and said wash liquid is water.

7. A method for cleaning a filter cartridge vertically positioned within a filter tank having an upper, influent compartment and a lower filtrate compartment, said filter cartridge being positioned within said influent compartment and having a pre-coat layer of finely divided ion exchange resin particles, said method comprising: draining influent liquid from said influent compartment until the level of said influent liquid is at least below said filter cartridge; establishing a level of wash water in said filtrate compartment; delivering said wash water to the interior of said cartridge from a point below said water level; simultaneously delivering air into the interior of said cartridge through a metering port in said filtrate compartment entirely above said water level to gradually fill said influent compartment with said wash water; and gradually draining said wash water from said influent compartment while delivering air into said filter cartridge through said metering port.

8. The method for cleaning a filter cartridge as defined in claim 7 wherein said filling and said draining are repeated a sufficient number of times to remove a major portion of said ion exchange resin particles from said cartridge.

9. The method for cleaning a filter cartridge as defined in claim 7 wherein said wash water and said gas are simultaneously delivered to a plurality of filter cartridges.

10. The method for cleaning a filter cartridge as defined in claim 7 wherein said filter tank is filled with said wash water at a rate so that the water level rises at about 3 to 15 inches per minute, and wherein said wash water is drained from said tank at a rate so that the water level falls at about 4 to 6 inches per minute.

11. The method for cleaning a filter cartridge as defined in claim 10 wherein said air has a flow rate of about 1 to 1.5 cubic feet per minute per square foot of filter surface area.

12. Improved apparatus for filtering liquids comprising: a filter tank; a plate separating said tank into an upper, influent compartment and a lower, filtrate compartment; a plurality of annular filter cartridge seat means vertically mounted in said plate means and providing communication between said influent compartment and said filtrate compartment; a plurality of annular filter cartridges vertically mounted on said seat means in said influent compartment; a plurality of gas distributors mounted on the bottom of said seat means in said filtrate compartment, said gas distributors each having a lower, liquid inlet and an upper, gas inlet; a gas inlet communicating with an upper portion of said filtrate compartment; a wash liquid inlet communicating with said filtrate compartment; and drain means communicating with said influent compartment.

13. Improved apparatus for filtering liquids comprising: a filter tank; a plate separating said tank into an upper, influent compartment and a lower, filtrate compartment; a plurality of annular filter cartridge seat means vertically mounted in said plate means and providing communication between said influent compartment and said filtrate compartment; a plurality of annular filter cartridges vertically mounted on said seat means in said influent compartment; a plurality of gas distributors mounted on the bottom of said seat means in said filtrate compartment, said gas distributors each having a lower, liquid inlet and an upper, gas inlet, said liquid inlets all being on substantially the same horizontal plane; a gas inlet communicating with an upper portion of said filtrate compartment; a wash liquid inlet communicating with said filtrate compartment; and drain means communicating with said influent compartment.

14. The apparatus as defined in claim 13 further including means for delivering a slurry of pre-coat medium into said influent compartment; and means for simultaneously withdrawing liquid from said filtrate compartment.

15. The apparatus as defined in claim 13 wherein said lower liquid inlet in each of said gas distributors lies in a substantially horizontal plane.

* * * * *

UNITED STATES PATENT OFFICE
CERTIFICATE OF CORRECTION

Patent No. 3,666,097    Dated  May 30, 1972

Inventor(s) Leo F. Ryan

It is certified that error appears in the above-identified patent and that said Letters Patent are hereby corrected as shown below:

Column 2, line 62, delete "Ser. No. 644,710" and insert "Patent No. 3,405,807".

Column 4, line 15, after "pre-coat", second occurrence, insert "recycle".

Column 4, line 59, after "opened," delete "the".

Column 5, line 30, "111" should be "110".

Column 6, line 24, "am" should be "an".

Column 6, line 31, "Through" should be "Though".

Signed and sealed this 22nd day of May 1973.

(SEAL)
Attest:

EDWARD M. FLETCHER, JR.
Attesting Officer

ROBERT GOTTSCHALK
Commissioner of Patents